Figures 1A, 1B:
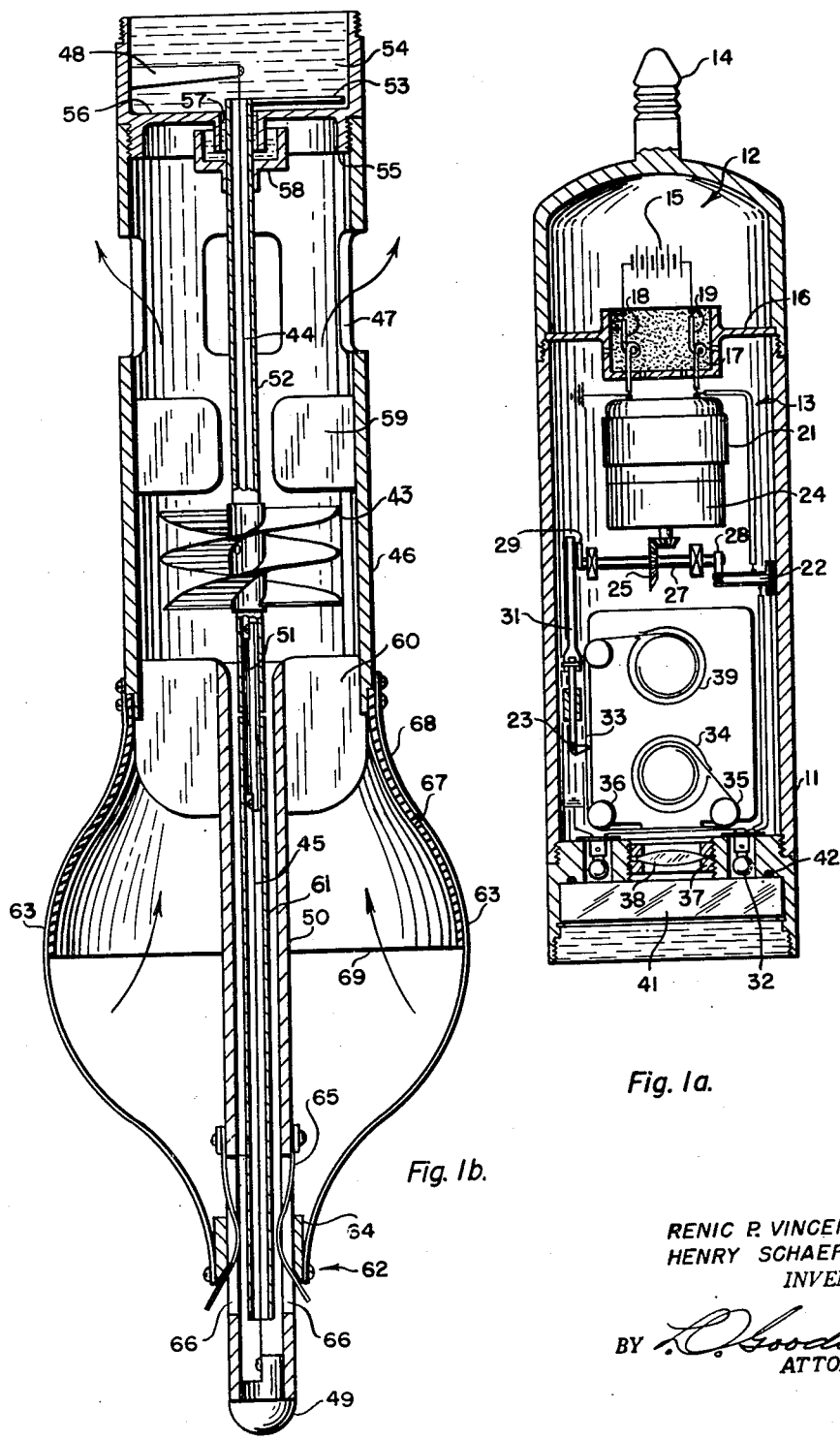

April 19, 1955   R. P. VINCENT ET AL   2,706,406
FLUID FLOWMETER

Filed Sept. 23, 1949   2 Sheets-Sheet 1

RENIC P. VINCENT
HENRY SCHAEFER
INVENTORS

BY L. O. Goodwin
ATTORNEY

RENIC P. VINCENT
HENRY SCHAEFER
INVENTORS 2,706,406
Patented Apr. 19, 1955

2,706,406

FLUID FLOWMETER

Renic P. Vincent and Henry Schaefer, Tulsa, Okla., assignors to Stanolind Oil and Gas Company, a corporation of Delaware Application September 23, 1949, Serial No. 117,472

5 Claims. (Cl. 73—155)

This invention pertains to an apparatus for measuring the velocity of fluids flowing in a conduit, well, casing, or the like. More particularly, this invention relates to a highly sensitive flowmeter adapted to measure and record fluid velocities in wells, including particularly wells or sections of wells producing at low rates.

Fluid velocities have been measured in wells with, in general, three types of apparatus: namely, differential-pressure or velocity-head sensitive elements, rotating impeller, and hot wire instruments. Each of these types of instruments is insensitive to fluid velocities in the range where many oil and gas wells or sections of such wells produce. For example, we have found that in a well producing gas at a rate of 222,000 cubic feet per day, standard conditions, at a bottom-hole pressure and temperature of about 450 p. s. i. g. and 85° F., respectively, the fluid velocity in an 8-inch hole for the total volume of production is only 15 feet per minute (1.875 miles per hour), while in a 6-inch diameter hole with a fluid velocity of 15 feet per minute the production is only 125 MCF per day. Similarly, in an 8-inch oil well producing 90 barrels per day, the fluid velocity is only 1 foot per minute; and, for the same velocity in a 6-inch well, the production is only 50 barrels per day. Obviously, at points in a well where less than the total production is flowing, the fluid velocities are proportionally lower. Highly sensitive apparatus is required to measure these extremely low velocities, and the apparatus must be adapted to measure a wide range of velocities during any well survey. Fluid flowmeters of the type previously proposed have been found totally incapable of measuring such velocities.

It is therefore an object of this invention to provide an apparatus sensitive to extremely low fluid velocities. A further object of this invention is to provide a well flowmeter sensitive to velocities encountered in wells which produce at low rates. A further object of this invention is to provide a well flowmeter employing a non-reactive recorder and a frictionless, flow-sensitive element which will thereby be sensitive to extremely low fluid velocities such as encountered in oil and gas wells producing at low rates. A still further object of this invention is to provide, in a self-contained well recording instrument employing a hermetically sealed camera, means to record the movement of a velocity sensitivity element exposed to the well fluids. These and other objects of our invention will become more apparent as the description thereof proceeds.

Figure 2:
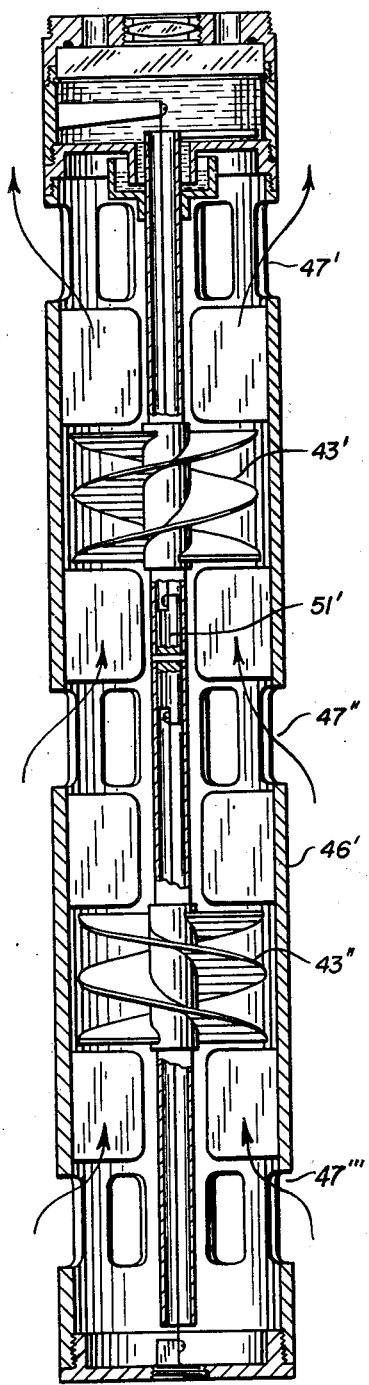

This invention may be described, in brief, as an apparatus for measuring a wide range of fluid velocities including, particularly, low fluid velocities, in oil and gas wells. High sensitivity at low fluid velocities is accomplished by making the helical flow-sensitive element free from friction and other extraneous forces other than fluid velocity. To avoid the application of external forces on the flow-sensitive element, it is mounted to operate in torsion, and the recording element is non-reactive upon the flow-sensitive element. That is, no power or force from the flow-sensitive element is required to operate the fluid-velocity recorder. In the following detailed description, reference will be made to the accompanying drawings, in which:

Figures 1a and 1b are elevational views, partially in cross section, showing a preferred embodiment of our invention; and Figure 2 is an elevation view, partly in cross section, of a second embodiment of a flow-sensitive element according to our invention.

Referring now more particularly to Figure 1, the preferred embodiment of our apparatus consists of a camera 11, consisting of a battery compartment 12 and a recording compartment 13, which are hermetically sealed and adapted to be operated under oil and gas well pressures, i. e., pressures up to 10,000 p. s. i. or greater. At the top of the battery compartment, a fishing neck 14, having an axial hole part way therethrough to attach a suspending uninsulated cable, as is well known in the art, is provided. The battery compartment contains any number of electric cells 15 which are separated from the recording compartment 13 by a permeable divider 16. This divider is preferably constructed of a high-resistance material such as perforated Bakelite. It contains a cup or reservoir 17 in which a desiccant such as silica gel is stored. We have found that, during the discharge of dry-cell batteries, water vapor is released and, to avoid injury to the elements in the recording compartment, the water vapor released by the batteries is preferably absorbed in the desiccant. This desiccant also absorbs moisture from air trapped in the recording compartment when the instrument is assembled. The battery terminals are connected to leads 18 and 19 which extend through the divider 16. These leads are connected to a small D. C. electric motor 21. A switch for the motor is generally unnecessary since, as will be shown in greater detail hereinafter, the motor is adapted to run continuously throughout a well survey. Battery energy sufficient to operate the motor continuously for as much as 8 hours or longer is therefore generally desirable. In some cases, it may be desirable to operate the motor continuously over a period of 24 hours or more; in such case, the battery energy can be increased practically without limit by lengthening the battery compartment and adding dry cells in parallel.

Motor 21 operates a make-and-break switch 22 and a film feeder 23. Inasmuch as the motor generally runs at 1000 R. P. M. or greater, and inasmuch as it is generally desirable to record fluid velocities at intervals of one minute or greater, the speed of the motor is reduced by a gear train 24 and bevel gears 25 before the switch-operating and film-advance shaft 27 is reached. A cam 28, on one end of the shaft, periodically closes switch 22 upon each rotation of the shaft, which, as indicated above, is preferably about once a minute. A crank 29, on the other end of the shaft, is connected by a link 31 to the film feeder 23. When switch 22 is closed, light bulbs 32 are energized. These bulbs which illuminate the object, as hereinafter described, are preferably energized during the time interval when the film feeder 23 is descending, i. e., during the time that the film 33 is stationary. The object may be illuminated over a considerable period of time. We have found it desirable in some cases, for example, to illuminate the object over a period of about ten seconds or greater to obtain thereby a range of fluctuations from which an average value can be deduced. During the time that bulbs 32 are not illuminated (i. e., during the time switch 22 is open) the film advance 23 moves the film forward one frame, which amounts generally to about 16 mm. or more. The film is initially stored in a first magazine 34 from which it advances around rolls 35 and 36. These rolls hold it adjacent the aperture 37 in which is located lens 38. As the film is advanced periodically, it is withdrawn from magazine 34, exposed when switch 22 is closed as it passes aperture 37, and the exposed film is stored in a second magazine 39. It will be apparent that thus far we have described a camera which is adapted periodically to photograph automatically any object visible to film 33 through aperture 37. Various modifications of such a camera will be apparent, the only limitation being that the film can obviously not be exposed continuously: i. e., means must be provided to expose the film only at a selected time. According to the preferred embodiment, the film is exposed periodically as above described; however, it will be apparent that in some cases a single exposure at a selected time will suffice.

This camera is adapted to be employed under oil and gas well conditions by hermetically sealing the recording and battery compartments. This is accomplished by a high-pressure, transparent enclosure at the open lower end. The enclosure may consist of a glass plate 41 adapted as by gasket 42 to seal the lower end of the recording compartment.

This camera may be attached to or associated with any apparatus adapted to measure a well characteristic. It is particularly adaptable, however, to association with an apparatus for recording a well characteristic in which the power output is very small: i. e., an apparatus requiring a non-reactive recorder. Fluid velocity in a well producing at a low rate is a typical characteristic to which this recording apparatus is particularly adaptable. In one embodiment of a fluid-velocity apparatus adapted to be associated with the above-described camera, a velocity-sensitive impeller 43 is flexibly mounted by torsion ribbons 44 and 45 within a protecting case 46 between the open bottom and perforations 47 to permit flow past the impeller. Upper ribbon 44 is attached indirectly to and rotates with the impeller. The upper end of lower ribbon 45 is also attached indirectly to and rotates with the impeller. The lower end of ribbon 45 is attached to bottom support 49. This bottom support is held by a small-diameter tubular extension 50 of protecting case 46. Impeller 43 is mounted either on a shaft 51 to which the upper and lower torsion ribbons 44 and 45, respectively, are attached or it may, as indicated, be mounted on upper tube 52. This upper tube is fixed to shaft 51 and surrounds upper ribbon 44. An indicator 53 within chamber 54 is affixed to the end of upper tube 52. The indicator thus rotates with impeller 43. The position of indicator 53 is an indication of the position of impeller 43 relative to any index such as upper support 48 and is therefore an indication of the velocity of fluids in the case 46. The camera is adapted to record such position. Since the index and indicator must be visible to the film 33, chamber 54 is preferably filled with a transparent liquid such as water, alcohol, or a light hydrocarbon such as gasoline or kerosene.

To prevent contamination of the fluid in this chamber, a friction-free liquid-packed fluid pressure seal 55 is provided. This may consist of a lower chamber head 56 having a cylindrical extension 57 down into a cup 58 which is mounted on and rotates with upper tube 52. The cup may be filled with a heavy, preferably non-viscous, liquid such as mercury, which is not miscible with either the well fluids or the fluid in chamber 54. We have found, however, that with the apparatus as shown the intermixing of the transparent fluid with well fluids even in the absence of a separating liquid such as mercury is negligible even where the fluid densities are substantially equal and the fluids are miscible. By this arrangement it will be apparent that we have, aside from the hysteresis of upper ribbon 44 and lower ribbon 45 and variations in the fluid velocity itself, avoided any variable external force on the flow-sensitive element. In this connection also, upper straightening vanes 59 and lower straightening vanes 60 in case 46 are adapted to eliminate any turbulence, radial flow, and the like, and produce absolutely axial flow in the case 46.

A lower tube 61 is attached to shaft 51 and impeller 43 and extends downward around lower torsion ribbon 45. In normal operation, this lower tube is otherwise unsupported. Due to the desirability of obtaining high sensitivity in well casing and in open holes, it is highly desirable to prevent injury to the sensitive flow elements during the time the apparatus is being lowered into a well through the tubing. Since the tubing is substantially smaller in diameter than the casing, the screen, or the open hole in which velocities are to be obtained, and since the flowmeter is generally lowered through the tubing at high velocities, the velocity of the fluid past the impeller 43 as the instrument is lowered through the tubing will normally be greater than the instrument is adapted to measure. Stated differently, if the velocity in the test zone is to be measured accurately, the displacement of the flow-indicating member in that zone is, by a selection of impellers, ribbons, and the like, made to be distorted by the fluid through a wide range, preferably through substantially one complete revolution at the maximum expected velocity. At such velocity in this test zone, the quantity of gas being equal in the tubing and in the casing just below the tubing, the velocity of fluid past the flowmeter in the tubing may be as much as 4 to 50 times or more greater than the velocity in the test section. Accordingly, it is highly desirable that means be provided for protecting the flow-sensitive element from destruction during the time the instrument is in the tubing or any other constricted opening in the well. To accomplish this protection, we provide, for example, a brake or locking device 62 adapted to hold the impeller and prevent rotation while the instrument is in a constricted opening. In this connection, flexible bow springs 63 may be attached, at the upper and lower ends, respectively, to case 46 and a floating collar 64. Flexible springs 65 may be attached at one end to tubular extension 50 and extend through slots 66 to contact lower tube 61. These springs, however, are not normally in contact with lower tube 61 when the instrument is in operating condition. As the instrument is being lowered through the tubing, bow springs 63 are compressed radially and elongated longitudinally, thus driving floating collar 64 downwardly, compressing springs 65, and forcing them into contact with tube 61. Tube 62 being attached to shaft 51 and impeller 43, the impeller is thus locked or otherwise held inoperative during the time bow springs 63 are located in a constricted opening. The maximum diameter of bow springs 63 in their normal unstressed condition is preferably substantially equal to or, in some cases, less than the diameter of a conduit in which a fluid-flow velocity test is made. However, in some cases, it may be desirable to make this diameter greater than the diameter of the hole at the test section to center thereby the apparatus in the hole and to extend a packer 67, which may be supported by bow springs 63, to the full diameter of the hole and thereby divert a greater percentage of the fluid stream through case 46 past the flow-sensitive element, impeller 43. By thus diverting the full stream in a 6-inch hole through case 46, which is normally about 2 inches in diameter, the instrument can be adapted to measuring velocities nine times as great as where the instrument is used without the packer in holes of this size. For example, we have found that liquid velocities of about 0.1 foot per minute in a 6-inch conduit can be accurately detected and recorded with this modification of the preferred embodiment.

While the above-described embodiment is particularly adapted to the measurement of fluid velocity in an upward direction, i. e., to the logging of a producing well, it will be apparent that the apparatus is readily adaptable to the measurement of fluid velocity and the production of permeability profiles in gas or water input or disposal wells. The apparatus as described would, in fact, be adaptable in the form described to such an application.

In either a producing or input well, before a well survey is made, proper sized torsion ribbons 44 and 45 are installed. We have found, for example, that if torsion ribbons are about 0.002 by 0.032 inch by 10 inches long, with a Bakelite impeller 1½ inches long by 1½ inches in diameter, having a two-start or double thread and a lead of 3 inches, the impeller 43 and indicator 53 will rotate about 3° for a liquid velocity of 1 foot per minute; at higher velocities the deflection of the impeller increases substantially directly as the square of the velocity. Obviously, the instrument can be constructed to be sensitive to velocities substantially lower than 1 foot per minute of liquid flow by reduction in the cross-sectional area of the ribbons, by lengthening the ribbons, by changing the pitch of the impeller, or the like. Reduction of the cross-sectional area of the ribbons below 0.002 by 0.016 inch has, however, been found undesirable since they become too fragile for rough handling.

In some cases, we have found in logging the permeability of formations penetrated by a well that a thief formation may be encountered, i. e., a low-pressure formation which takes gas from a higher-pressure formation penetrated by the well. Under such certain circumstances, the direction of flow of gas in a well may be reversed. Such reversal can readily be detected, since the record on film 33 will show that indicator 53 gradually progresses from one side of the index to the other, through the index.

In operation, when the above adjustments are completed, a steel line is attached to the fishing neck 14, the film is loaded, batteries installed, the indicator is set on the index, and the camera is hermetically sealed. The bow springs 63 are then compressed and inserted into the top of the tubing (not shown). The flowmeter is then lowered through the tubing, the impeller being locked in position, as above described, until the instrument runs out the bottom of the tubing. At this point it may be desirable to calibrate the instrument for each well, since the fluid composition, average density, temperature, and the like are different in each well. The flowmeter may be calibrated in cubic feet per unit time by determining the deflection of the indicator in a known-diameter hole when a known volume of fluid is flowing past the meter. Therefore, while the flowmeter is held in a hole of known size near the bottom of the tubing where well and surface flows are equal, a record, or possibly several recordings of the position of the indicator, is made. The actual volume of fluid flowing at any point of known diameter in the hole may then be determined by stopping the apparatus long enough to make a record and subsequently, at the surface, correlating the record against time to obtain depth and against total production. By retaining a substantially constant flow and lowering the flowmeter through the test section, the deflection at any point, compared to the total deflection at the bottom of the tubing, will be proportional to the permeability or production below that point, compared to the total permeability or production of the well. Since only relative permeability is generally required, it is therefore unnecessary to calibrate the instrument in each well, the relative deflection of the indicator being sufficient to produce a log of velocity vs. depth.

Referring now more particularly to Figure 2 of the drawings, the flowmeter described above may be modified to produce a log of differential production or differential productivity at two zones or two elevations in a well. In this modification, the case 46' has three sets of perforations 47', 47'', and 47''' which are spaced along the case so that the gas flowing through the case past the upper and lower impellers 43' and 43'' tends to be proportional to the flow outside the case at the level of the respective impellers. Both impellers 43' and 43'' are connected to shaft 51' and separated by a suitable distance. The two have opposite reactions in the same fluid stream so that in a well in which all of the fluid enters below case 46' the same amount of fluid contacts both impellers and the tendency of each to rotate is counteracted by the other. The indicator 53 then tends to remain at the index. When, however, as is quite often the case, fluid enters the well at an intermediate zone, the volume of fluid flowing in the zone between perforations 47' and 47'' is greater than the volume of fluid flowing between perforations 47'' and 47'''. The reaction, in this case, on upper impeller 43' is greater than the reaction on lower impeller 43''. Consequently, the indicator will be rotated to show qualitatively the difference in production or permeability at the two zones or elevations. Furthermore, the direction of rotation of indicator 53 will be indicative of the direction of increase. More specifically, an increase in flow at the elevation of the upper impeller will rotate the indicator in, for example, a clockwise direction, while a flow in the opposite direction, such as caused by a thief formation, will cause the index to be rotated in a counterclockwise direction. A permeability or productivity log made with this embodiment of our invention can be interpreted in the same manner as the log produced by the preferred apparatus. Obviously, however, it cannot be readily adapted to quantitative measurement, it being better adapted to show relative permeabilities at two zones.

Manifestly, the construction as shown and described is capable of some modification, and such modification as may be construed to fall within the scope and meaning of the appended claims is also considered to be within the spirit and intent of the invention.

We claim:
1. A flowmeter for recording fluid velocity in a well employing a velocity-sensitive element, a brake for said velocity-sensitive element, and means on said flowmeter responsive to variations in the diameter of said well, said brake being actuated by said means to restrain movement of said velocity-sensitive element when said flowmeter is located in a constriction in said well.

2. In an apparatus for recording within a well the fluid velocity at a point in said well, the combination comprising a rotatably mounted flow-sensitive impeller exposed to the well fluids, a torsionally resilient support for said impeller, photographic means hermetically sealed in a case which includes a transparent window, an enclosed chamber between said case and said flow-sensitive impeller, said transparent window forming a common wall between said case and said chamber, a transparent fluid in said chamber, an indicator connected to said impeller and extending through a wall into said enclosed chamber, and a liquid-packed fluid pressure seal around said indicator where it passes through said wall, said seal forming a fluid barrier between said transparent fluid in said chamber and said well fluids whereby the position of said impeller may be photographed to record accurately the velocity of the fluid past said impeller in said well.

3. In an apparatus for recording within a well the fluid velocity at a point in said well, the combination comprising a case, a transparent window in said case, a torsionally resilient support, a flow-sensitive impeller exposed to the well fluids and rotatably mounted on said torsionally resilient support, photographic means hermetically sealed in said case, an enclosed chamber between said case and said flow-sensitive impeller, said transparent window forming a common partition between said case and said chamber, a transparent fluid in said chamber, a shaft extending from said flow-sensitive impeller through a wall into said enclosed chamber, means within said enclosed chamber on the end of said shaft to indicate the position of said flow-sensitive impeller, and a liquid-packed fluid pressure seal forming a fluid barrier between said shaft and said wall whereby said transparent fluid is not contaminated by said well fluids and the position of said flow-sensitive impeller can be photographed without any errors due to friction.

4. In an apparatus for recording within a well the differential fluid velocity between two vertically spaced points in said well the combination comprising a case, a transparent window in said case, a torsionally resilient support, two vertically spaced flow-sensitive impellers exposed to the well fluids and mounted to rotate together on said torsionally resilient support, said two spaced flow-sensitive impellers having opposite rotary reactions in the well fluid flow stream, photographic means hermetically sealed in said case, an enclosed chamber between said case and said flow-sensitive impellers, said transparent window forming a common wall between said case and said chamber, a transparent fluid in said chamber, an indicator connected to said impellers and extending through a wall into said enclosed chamber, and a liquid-packed fluid pressure seal around said indicator where it passes through said wall forming a fluid barrier between said transparent fluid in said chamber and said well fluids, whereby said transparent fluid is not contaminated by said well fluids and the position of said flow-sensitive impeller can be photographed without any errors due to friction.

5. An apparatus according to claim 2 including means responsive to variations in the diameter of said well to restrain movement of said flow sensitive impeller when said apparatus is located in a constriction in said well whereby said torsionally resilient support is not distorted beyond its elastic limit due to the relatively high velocity of well fluids in said constriction.

References Cited in the file of this patent

UNITED STATES PATENTS

| | | |
|---|---|---|
| 1,406,682 | Rathbone | Feb. 14, 1922 |
| 1,658,537 | Reinhold | Feb. 7, 1928 |
| 1,665,141 | Mayer | Apr. 3, 1928 |
| 1,796,547 | Trout | Mar. 17, 1931 |
| 1,877,593 | Roman | Sept. 13, 1932 |
| 1,898,473 | Williston etal. | Feb. 21, 1933 |
| 1,910,720 | Tarlton | May 23, 1933 |
| 2,103,235 | Conrad | Dec. 28, 1937 |
| 2,175,025 | Hooven | Oct. 3, 1939 |
| 2,203,176 | Opocensky | June 4, 1940 |
| 2,316,255 | Knobel | Apr. 13, 1943 |
| 2,345,770 | Park | Apr. 4, 1944 |
| 2,348,192 | Chambers | May 9, 1944 |
| 2,382,609 | Dale | Aug. 14, 1945 |
| 2,395,137 | Millikan | Feb. 19, 1946 |
| 2,426,947 | Potts | Sept. 2, 1947 |
| 2,483,190 | Evans | Sept. 27, 1949 |

FOREIGN PATENTS

| | | |
|---|---|---|
| 510,174 | Great Britain | July 27, 1939 |